G. DAVIS.
BINDER PLATFORM.
APPLICATION FILED JAN. 30, 1919. RENEWED JUNE 25, 1921.
1,405,571.
Patented Feb. 7, 1922.
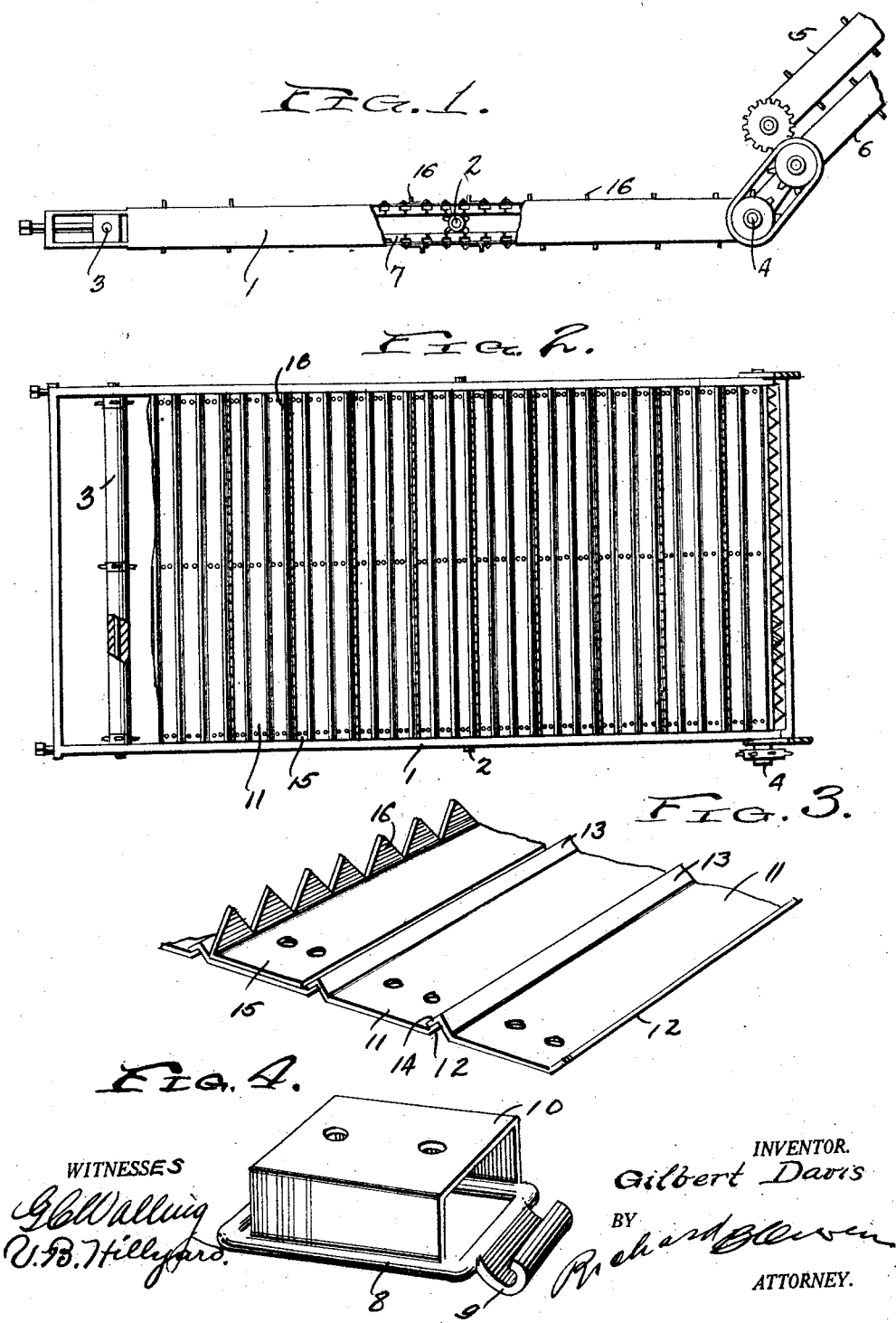
INVENTOR.
Gilbert Davis
BY
ATTORNEY.
WITNESSES

UNITED STATES PATENT OFFICE.

GILBERT DAVIS, OF NICHOLSON, NORTH DAKOTA.

BINDER PLATFORM.

1,405,571.

Specification of Letters Patent.   Patented Feb. 7, 1922.

Application filed January 30, 1919, Serial No. 273,965. Renewed June 25, 1921. Serial No. 480,465.

*To all whom it may concern:*

Be it known that I, GILBERT DAVIS, a citizen of the United States, residing at Nicholson, in the county of Sargent and State of North Dakota, have invented certain new and useful Improvements in Binder Platforms, of which the following is a specification.

The invention relates to endless aprons designed for use in connection with agricultural and milling machinery and in its specific adaptation the invention provides an endless or traveling platform for binders, harvesters, threshing machines and the like.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the drawing hereto attached,

Fig. 1 is an edge view showing the invention adapted for use as an endless platform.

Fig. 2 is a top plan view.

Fig. 3 is a detail perspective view of a portion of the endless apron.

Fig. 4 is a detail perspective view of one of the links of the endless chains which receive the plates or strips.

Corresponding and like parts are referred to in the following description and indicated in the several views of the drawing by like reference characters.

The invention contemplates a suitable frame 1 which forms a support for the endless apron. The frame receives an intermediate roller 2 and end rollers 3 and 4 which support the endless apron. One of the end rollers as 3 is adjustable to admit of properly tensioning the apron in a manner well understood. An elevator is located at one end of the platform and comprises members 5 and 6 between which the material is elevated in a manner well understood.

Inasmuch as the present invention relates to the endless apron it is not deemed necessary to describe the adjunctive parts in detail since they may be of any well known construction and arrangement employed in connection with endless aprons of agricultural and milling machinery. In accordance with the present invention a plurality of endless chains 7 are provided and engage sprocket wheels on the several supporting rollers 2, 3 and 4. Each of these chains comprises links which have the form substantially as shown in Fig. 4. Each link consists of a rectangular frame 8 having a hook 9 at one end and provided upon one side with an elevated portion 10 which clears the teeth of the spur wheels and forms means of attachment for the strips or plates comprising the element of the apron. The several parts comprising the links are preferably of integral formation and adapted to be constructed as in any manner of chains.

A plurality of plates or strips 11 are secured to the links of the chain and are fastened to the tops of the elevated or raised portions 10. The strips or plates 11 usually consist of sheet metal of suitable length and width. One edge of each of the strips is upturned, as indicated at 12 forming a flange or lip which extends at an obtuse angle. The opposite edge portion of the strip or plate is similarly upturned, as indicated at 13 and is bent to project in an opposite direction as shown at 14. The reversely bent portions 13 and 14 result in providing the strip or plate with an anticlinal edge portion, the lip or flange 14 of which overlaps the upstanding portion 12 of the adjacent strip or plate so as to maintain a close joint between the strips or plates. The construction is such as to provide an endless apron having a practically continuous supporting surface and which at the same time is flexible so as to pass around the end rollers 3 and 4 without causing any strain or unsteady movement. It is also observed that the bent edge portions of the strips or plates 11 serve to stiffen and strengthen the plates and at the same time provide ribs or flights which assist materially in positively feeding the material along the apron.

Other plates or strips 15 are riveted and bolted or otherwise fastened to certain strips 11 and have an edge portion bent upwardly and serrated to provide teeth 16 which positively engage the material and move the same in the operation of the apron. These plates or strips 15 are likewise of sheet metal and serve to reenforce the strips 11 to which they are attached.

It is to be understood that the invention is adapted for use as a travelling platform, as a feeder or as an elevator or in any connection where an endless apron is required for use in connection with agricultural and milling machinery for feeding or advancing material to be moved from one point to another.

The foregoing description and the drawing have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

An endless apron, comprising a plurality of flat plates, each plate having a longitudinal edge upturned at an obtuse angle and having its opposite longitudinal edge similarly upturned and rebent to form an anti-clinal portion, the plates being arranged with the outer lip of the anti-clinal portion overlapping the upturned edge of the last plate, other plates secured to the flat plates between the upturned edges thereof whereby independent movement thereof will be resisted independent of the securing means and having an edge upturned and toothed, and means connecting the plates to admit of their articulation.

In testimony whereof I affix my signature in presence of two witnesses.

GILBERT DAVIS.

Witnesses:
C. E. RONEY,
Mrs. E. CARY.